(12) United States Patent
Wang et al.

(10) Patent No.: US 12,355,058 B2
(45) Date of Patent: Jul. 8, 2025

(54) ROLLING DEVICE AND MEASURING DEVICE

(71) Applicant: CONTEMPORARY AMPEREX TECHNOLOGY (HONG KONG) LIMITED, Hong Kong (CN)

(72) Inventors: Pengpeng Wang, Ningde (CN); Di Yang, Ningde (CN); Lei Song, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 274 days.

(21) Appl. No.: 18/346,664

(22) Filed: Jul. 3, 2023

(65) Prior Publication Data

US 2024/0149316 A1 May 9, 2024

Related U.S. Application Data

(63) Continuation of application No. PCT/CN2023/083550, filed on Mar. 24, 2023.

(30) Foreign Application Priority Data

Nov. 8, 2022 (CN) .......................... 202222960382.5

(51) Int. Cl.
  *B30B 3/02* (2006.01)
  *B30B 15/00* (2006.01)
  *H01M 4/04* (2006.01)
(52) U.S. Cl.
  CPC ........... *H01M 4/0435* (2013.01); *B30B 15/00* (2013.01); *B30B 3/02* (2013.01)

(58) Field of Classification Search
  CPC ........ H01M 4/0435; B30B 15/00; B30B 3/02; B30B 3/005; B21B 38/00; B21B 38/10; B21B 38/04
  See application file for complete search history.

(56) References Cited

FOREIGN PATENT DOCUMENTS

| CN | 106393772 A | * | 2/2017 |
| CN | 109080190 A | | 12/2018 |
| CN | 213108351 U | | 5/2021 |
| CN | 213866905 U | | 8/2021 |

(Continued)

OTHER PUBLICATIONS

Translation of CN-216683452.*

(Continued)

*Primary Examiner* — Bobby Yeonjin Kim
(74) *Attorney, Agent, or Firm* — Ladas & Parry LLP

(57) ABSTRACT

A rolling device and a measuring device are disclosed. A rolling assembly in the rolling device is movably mounted on a bracket in a first direction (a) parallel to a working surface, and when a member to be rolled is placed on the working surface, the rolling assembly provides a rolling pressure to the member to be rolled. In a rolling process, the rolling assembly moves in the first direction (a), so as to be capable of ensuring that the rolling pressure applied to the member to be rolled is constant and always perpendicular to the member to be rolled, that is, ensuring that the rolling pressure remains constant, thereby reducing the influence of external factors on the rolling process and improving the accuracy of a measurement result.

10 Claims, 5 Drawing Sheets

(56) References Cited

FOREIGN PATENT DOCUMENTS

| | | | |
|---|---|---|---|
| CN | 216400642 U | | 4/2022 |
| CN | 216683452 U | * | 6/2022 |
| CN | 218399544 U | | 1/2023 |
| EP | 2865513 A1 | | 4/2015 |
| WO | 2022151541 A1 | | 7/2022 |

OTHER PUBLICATIONS

Translation of CN-106393772.*
Extended European Search Report for Application No. 23730346, mailed Jul. 15, 2024, 6 pages.
International Search Report for Application No. PCT/CN2023/083550, mailed on Aug. 4, 2023, 6 pages.
Notice of Intent to Grant EP application 23730346.6 dated Feb. 24, 2025, 6 pages.

* cited by examiner

ROLLING DEVICE AND MEASURING DEVICE

CROSS-REFERENCE TO RELATED APPLICATIONS

This application is a continuation of International application PCT/CN2023/083550 filed on Mar. 24, 2023 that claims priority to Chinese Patent Application No. 202222960382.5 filed on Nov. 8, 2022, which is incorporated herein by reference in its entirety.

TECHNICAL FIELD

The present application relates to the technical field of batteries, and in particular, to a rolling device and a measuring device.

BACKGROUND ART

Before measuring the shear force and bonding force of an electrode sheet, it is necessary to roll the electrode sheet so that the electrode sheet can be stably bonded to a rolled steel plate or another supporting structure for subsequent measurement.

At present, in a rolling process, it is often difficult to control the magnitude and direction of a rolling pressure, and the accommodation leads to changes in the rolling pressure, which results in the problem of a low accuracy of a final measurement result.

SUMMARY OF THE INVENTION

Based on this, it is necessary to provide a rolling device and a measuring device to solve the problem that a current rolling process cannot provide a constant rolling pressure, resulting in low accuracy of a measurement result.

In a first aspect, a rolling device is provided in the present application, including:
 a base having a working surface for placing a member to be rolled;
 a bracket arranged on the base; and
 a rolling assembly movably mounted on the bracket in a first direction, and used for providing a pressure to the member to be rolled on the working surface;
 wherein the first direction is parallel to the working surface.

In the technical solution of the embodiment of the present application, through the above structure, the rolling assembly is capable of moving on the bracket in the first direction parallel to the working surface. In a moving process, a constant rolling pressure is provided to the member to be rolled placed on the working surface, thereby improving the uniformity of the rolling process and improving the accuracy of subsequent shear force and bonding force measurement.

In some embodiments, the rolling assembly includes a connecting element and a rolling member, the connecting element is movably mounted on the bracket in the first direction, the rolling member is rotatably arranged on the connecting element around a rotating shaft, and an axial direction of the rotating shaft is parallel to the working surface.

In the technical solution of the embodiment of the present application, in the rolling process, the rolling member always follows the connecting element and moves in the first direction parallel to the working surface, and the axial direction of the rotating shaft of the rolling member is parallel to the working surface; therefore, a rolling force applied by the rolling member to the member to be rolled is always perpendicular to the member to be rolled, and there is no oblique upward or downward component force. Therefore, the magnitude and direction of the rolling pressure are kept constant, so that the rolling of the member to be rolled is more uniform.

In some embodiments, the rolling device includes a guiding member arranged on the bracket, and a matching portion that matches the guiding member is arranged on the connecting element, so that the connecting element is capable of moving in the first direction.

In the technical solution of the embodiment of the present application, through the matching connection between the guiding member and the matching portion, the connecting element moving in the first direction on the bracket is capable of being achieved. Therefore, the rolling member is driven by the connecting element to move in the first direction, and rolls the member to be rolled.

In some embodiments, the guiding member is configured as a guide rail extending in the first direction, and the matching portion is configured as a slider that fits the guide rail.

In the technical solution of the embodiment of the present application, by arranging the guide rail and the slider that are in matching connection to each other, stable connection between the connecting element and the bracket is capable of being realized, and the connecting element is capable of moving stably in the first direction under the guidance of the guide rail, thereby ensuring that the rolling member is capable of applying a stable and uniform rolling force to the member to be rolled.

In some embodiments, the guide rail includes a first sub-guide rail and a second sub-guide rail arranged at an interval in a second direction, and the slider includes a first sub-slider and a second sub-slider corresponding to the first sub-guide rail and the second sub-guide rail, respectively. The connecting element is connected between the first sub-slider and the second sub-slider.

The second direction intersects the first direction, and the second direction is parallel to the working surface.

In the technical solution of the embodiment of the present application, through the above structure, the connecting element is capable of being more stably arranged on the guide rail and moving stably in the first direction. In this process, the connecting element drives the rolling member to move synchronously, so that the rolling member is capable of applying a stable rolling force to the member to be rolled placed on the working surface, thereby improving the rolling precision.

In some embodiments, the connecting element includes a connecting main body as well as a first connecting beam and a second connecting beam respectively arranged on the connecting main body. The first connecting beam and the second connecting beam are respectively located on two opposite sides of the rolling member in the axial direction of the rotating shaft, and the first connecting beam and the second connecting beam are each provided with a through hole for accommodating the rotating shaft.

In the technical solution of the embodiment of the present application, through the above structure, the rolling member smoothly rotating around the rotating shaft while moving in the first direction along with the connecting element is capable of being achieved. Therefore, in the rolling process, the rolling member is capable of rolling the member to be rolled in the first direction, so that the force on the member to be rolled is uniform, and the rolling precision is improved.

In some embodiments, the through hole is configured as a kidney-shaped hole extending in a third direction, and the third direction is arranged to intersect the working surface.

In the technical solution of the embodiment of the present application, through the above structure, it can be ensured that the rolling pressure applied to the member to be rolled in the rolling process is always kept constant, thereby ensuring the accuracy of the rolling process and improving the accuracy of the subsequent shear force and bonding force measurement.

In some embodiments, the rolling device further includes first position limiting members arranged at opposite ends of the bracket in the first direction, and the first position limiting members are used for limiting the rolling assembly on the bracket in the first direction.

In the technical solution of the embodiment of the present application, by arranging the first position limiting members, the rolling assembly is capable of being arranged on the bracket more stably, thereby ensuring the smooth progress of the rolling process.

In some embodiments, an accommodating groove for placing at least a part of the member to be rolled is arranged on the working surface, and the depth of the accommodating groove is smaller than the thickness of the member to be rolled.

In the technical solution of the embodiment of the present application, the accommodating groove can limit a position of the member to be rolled placed on the working surface. When the member to be rolled is rolled by the rolling member, the accommodating groove can prevent the member to be rolled from moving, thereby ensuring the smooth progress of the rolling process.

In some embodiments, the accommodating groove has a closed end and an open end oppositely arranged in the first direction, and in a direction from the open end to the closed end, the closed end is capable of limiting the position of the member to be rolled in the accommodating groove.

In the technical solution of the embodiment of the present application, through the above structure, the accommodating groove is capable of adapting to members to be rolled in different sizes, so that the application range of the rolling device is wider.

In some embodiments, a second position limiting member is arranged on the base, and the second position limiting member is arranged corresponding to the open end at an interval. In a direction from the closed end to the open end, the second position limiting member is capable of limiting the position of the member to be rolled placed in the accommodating groove.

In the technical solution of the embodiment of the present application, when the member to be rolled is placed in the accommodating groove, and the member to be rolled is rolled by the rolling member, the closed end of the accommodating groove can cooperate with the second position limiting member to realize the position limiting of the member to be rolled in the first direction, thereby ensuring the smooth progress of the rolling process.

In some embodiments, the rolling device further includes an operating member arranged on the rolling assembly, and the operating member is used for providing a force application position on the rolling assembly.

In the technical solution of the embodiment of the present application, when rolling is required, a certain external force may be applied to the rolling assembly through the operating member, so that it moves in the first direction on the guide rail, thereby realizing the rolling for the member to be rolled.

In a second aspect, the present application provides a measuring device, including the above rolling device.

In the above rolling device and measuring device, the rolling assembly is movably mounted on the bracket in the first direction parallel to the working surface, and when the member to be rolled is placed on the working surface, the rolling assembly provides a rolling pressure to the member to be rolled. In the rolling process, the rolling assembly moves in the first direction, so as to be capable of ensuring that the rolling pressure applied to the member to be rolled is constant and always perpendicular to the member to be rolled, that is, to ensure that the rolling pressure remains constant, thereby reducing the influence of external factors on the rolling process and improving the accuracy of a measurement result.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

Various other advantages and benefits will become apparent to those of ordinary skill in the art upon reading the following detailed description of the embodiments. The drawings are for the purpose of illustrating the embodiments only and are not to be considered a limitation to the present application. Also, the same components are denoted by the same reference numerals throughout all the drawings. In the drawings.

Figure 1:
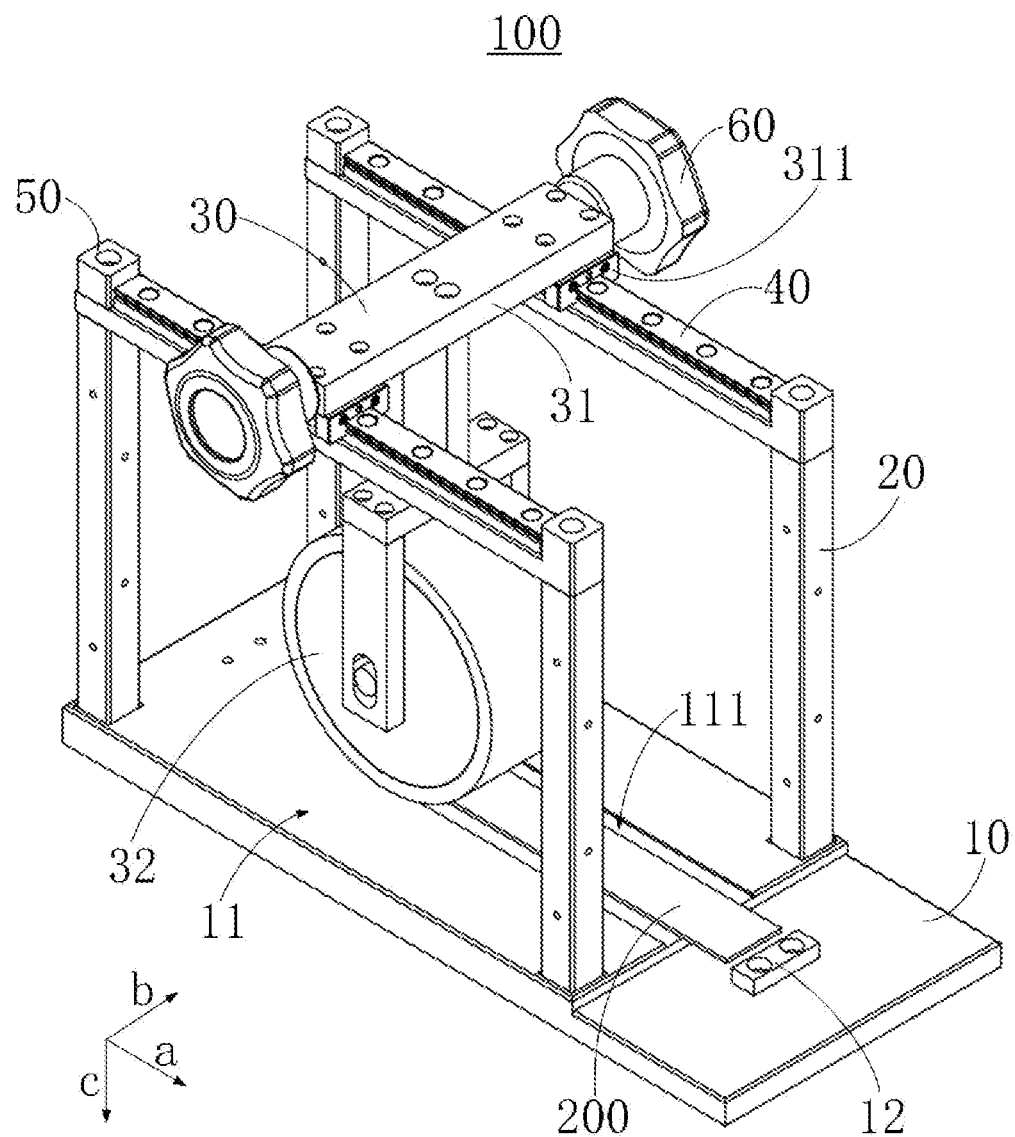
FIG. 1 is a schematic three-dimensional structural diagram of a rolling device according to one or a plurality of embodiments.

100. Rolling device; 200. Member to be rolled; 10. Base; 20. Bracket; 30. Rolling assembly; 40. Guiding member; 50. First position limiting member; 60. Operating member; 11. Working surface; 12. Second position limiting member; 31. Connecting element; 32. Rolling member; 41. First sub-guide rail; 42. Second sub-guide rail; 111. Accommodating groove; 311. Matching portion; 312. Connecting main body; 313. First connecting beam; 314. Second connecting beam; 1111. Closed end; 1112. Open end; 3111. First sub-slider; 3112. Second sub-slider; 3131. Through hole; a. First direction; b. Second direction; c. Third direction.

DETAILED DESCRIPTION

Embodiments of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first," "second," and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms such as "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", and "circumferential" are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms such as "mount," "join," "connect," and "fix" should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

At present, from the perspective of the development of the market situation, power batteries are more and more widely used. The power batteries are used in energy storage power source systems such as hydraulic, thermal, wind and solar power stations as well as in electric vehicles such as electric bicycles, electric motorcycles and electric cars, and other fields. With the continuous expansion of the application field of the power batteries, the market demand is also constantly expanding.

A battery is usually composed of one or a plurality of battery cells, that is, a battery cell is the smallest unit constituting a battery. The battery cell is composed of an end cover, a case, a cell assembly, and other functional components, wherein the cell assembly is a component of the battery cell that undergoes electrochemical reactions. The battery cell assembly is mainly formed by winding or stacking a positive electrode sheet and a negative electrode sheet, and a separator is usually arranged between the positive electrode sheet and the negative electrode sheet. The positive electrode sheet and the negative electrode sheet may be collectively referred to as electrode sheets. After the electrode sheet is manufactured, it needs to go through a series of testing procedures to ensure that the structure of the electrode sheet meets requirements for use.

It is necessary to measure the shear force and the bonding force of the electrode sheet. Before the measurement, it is first necessary to roll the electrode sheet to bond it to a rolled steel plate or another supporting structure for subsequent measurement.

At present, in the rolling process, a pressing wheel is usually manually operated, and a certain rolling force is applied to the electrode sheet by pulling the pressing wheel. However, in this process, when the pressing wheel is manually pulled, different pulling directions may be generated, such as obliquely upward or downward, so that the pressure does not completely perpendicularly act on the electrode sheet, resulting in an inaccurate subsequent measurement result.

Based on the above considerations, in order to ensure that the rolling pressure applied to the electrode sheet remains constant in the rolling process, one or a plurality of embodiments of the present application provide a rolling device, a rolling assembly moves on a bracket in a first direction, and in the moving process, an electrode sheet on a working surface is rolled, so as to ensure that the magnitude and direction of the rolling pressure remain constant, reduce the influence of external factors, and improve the accuracy of subsequent shear force and bonding force measurement.

Referring to FIG. 1, an embodiment of the present application provides a rolling device 100, including a base 10, a bracket 20, and a rolling assembly 30. The base 10 has a working surface 11 for placing a member to be rolled 200, and the bracket 20 is arranged on the base 10. The rolling assembly 30 is movably mounted on the bracket 20 in a first direction a, and is used for providing a pressure to the member to be rolled 200 on the working surface 11. The first direction a is parallel to the working surface 11.

It should be noted that when the rolling device 100 is applied to an electrode sheet, the member to be rolled 200 refers to an electrode sheet to be rolled and a rolled steel plate used for fixing the electrode sheet. The electrode sheet is fixed to the rolled steel plate with a double-sided adhesive tape or another connection structure, and then the rolled steel plate is placed on the working surface 11 to achieve fixing of the electrode sheet to the working surface 11.

Further, in order to facilitate fixing the member to be rolled 200 to the base 10 and reduce the influence of an external force on the rolling process, the working surface 11 is usually arranged as an upper surface of the base 10, that is, when the base 10 is fixed on the external supporting structure such as the ground or a desktop, the working surface 11 is a horizontal plane.

The bracket 20 is erected on the base 10. Specifically, the bracket 20 may be assembled from a plurality of beams and carlings that are perpendicular to each other, and the carlings are vertically arranged on the base 10, and the beams are horizontally connected to one end of the carlings away from the base 10, that is, the beams are arranged parallel to the working surface 11.

In addition, the beam is extended in the first direction a, and the rolling assembly is movably mounted on the beam, so that the rolling assembly 30 is capable of moving in the first direction a on the beam.

The rolling assembly 30 refers to a component capable of providing a rolling pressure to the member to be rolled 200 placed on the working surface 11. When the rolling assembly 30 moves in the first direction a on the beam, the end of the rolling assembly 30 away from the beam contacts with the member to be rolled 200, and applies a constant rolling pressure perpendicularly to the member to be rolled 200. As a result, the rolling pressure to the member to be rolled 200 is made more uniform, thereby improving the accuracy of the subsequent shear force and bonding force measurement.

Through the above structure, the rolling assembly 30 is capable of moving on the bracket 20 in the first direction a parallel to the working surface 11. In the moving process, a constant rolling pressure is provided to the member to be rolled 200 placed on the working surface 11, thereby improving the uniformity of the rolling process and improving the accuracy of subsequent shear force and bonding force measurement.

In some embodiments, the rolling assembly 30 includes a connecting element 31 and a rolling member 32, the connecting element 31 is movably mounted on the bracket 20 in the first direction a, the rolling member 32 is rotatably arranged on the connecting element 31 around a rotating shaft, and an axial direction of the rotating shaft is parallel to the working surface 11.

The connecting element 31 plays a connecting role between the bracket 20 and the rolling member 32, so that the rolling member 32 is capable of moving synchronously in the first direction a when driven by the connecting element 31.

Specifically, when the connecting element 31 moves in the first direction a on the bracket 20, the rolling member 32 moves synchronously with the connecting element 31. At the same time, the rolling member 32 presses downward against the member to be rolled 200 on the working surface 11, and the rolling member 32 rotates around the rotating shaft to achieve the effect of providing a continuous rolling force on the member to be rolled 200.

In the rolling process, the rolling member 32 always follows the connecting element 31 and moves in the first direction a parallel to the working surface 11, and the axial direction of the rotating shaft of the rolling member 32 is parallel to the working surface 11; therefore, a rolling force applied by the rolling member 32 to the member to be rolled 200 is always perpendicular to the member to be rolled 200, and there is no oblique upward or downward component force. Therefore, the magnitude and direction of the rolling pressure are kept constant, so that the rolling of the member to be rolled 200 is more uniform.

In some embodiments, the rolling device 100 includes a guiding member 40 arranged on the bracket 20, and a matching portion 311 that matches the guiding member 40 is arranged on the connecting element 31, so that the connecting element 31 is capable of moving in the first direction a.

It should be noted that the guiding member 40 and the bracket 20 may be arranged integrally or separately. When the guiding member 40 and the bracket 20 are arranged integrally, the guiding member 40 may be a part of the bracket 20, for example, a chute arranged on the bracket 20. When the guiding member 40 and the bracket 20 are arranged separately, the guiding member 40 may be mounted on the bracket 20, such as a beam structure having a chute, and the beam structure having a chute is mounted on the bracket 20.

Further, the matching portion 311 and the connecting element 31 may also be arranged integrally or separately. When the matching portion 311 and the connecting element 31 are arranged integrally, the matching portion 311 is actually one of parts on the connecting element 31, for example, when the guiding member part 40 is a chute, the matching portion 311 may be a protruding structure on the connecting element 31, and is capable of being engage into the chute. When the matching portion 311 and the connecting element 31 are arranged separately, the matching portion 311 may be mounted on the connecting element 31, for example, when the guiding member part 40 is a chute, the matching portion 311 may be a slider protruding from the connecting element 31, and is capable of being engaged into the chute.

Therefore, through the matching connection between the guiding member 40 and the matching portion 311, the connecting element 31 is capable of moving in the first direction a on the bracket 20. Therefore, the rolling member 32 is driven by the connecting element 31 to move in the first direction a, and rolls the member to be rolled 200.

In some embodiments, the guiding member 40 is configured as a guide rail extending in the first direction a, and the matching portion 311 is configured as a slider that fits the guide rail.

Specifically, when the bracket 20 is assembled from a beam and a carling. The beam extends in the first direction a and is connected to an end of the carling away from the base 10, and the guide rail is mounted on the beam in the extending direction of the beam. The slider on the connecting element 31 is in matching connection with the guide rail on the bracket 20, so that the connecting element 31 is capable of moving on the guide rail. At the same time, the connecting element 31 drives the rolling member 32 to move synchronously, thereby realizing the rolling action of the member to be rolled 200.

By arranging the guide rail and the slider that are in matching connection to each other, stable connection between the connecting element 31 and the bracket 20 is capable of being realized, and the connecting element 31 is capable of moving stably in the first direction a under the guidance of the guide rail, thereby ensuring that the rolling member 32 is capable of applying a stable and uniform rolling force to the member to be rolled 200.

In some other embodiments, the guiding member 40 and the matching portion 311 may also be configured as other mutually matching structures, for example, the guiding member may be arranged as a ball screw extending in the first direction a, and correspondingly, the matching portion 311 is arranged as a slider that fits the ball screw. For another example, the guiding member 40 may further be arranged as a chute extending in the first direction a, and correspondingly, the matching portion 311 is arranged as a slider snap fitted in the chute, so as to be capable of driving the connecting element 31 to move in the chute. Of course, the guiding member 40 and the matching portion 311 may also be arranged as other mutually matching connection structures, which will not be described in detail here.

Figure 2:
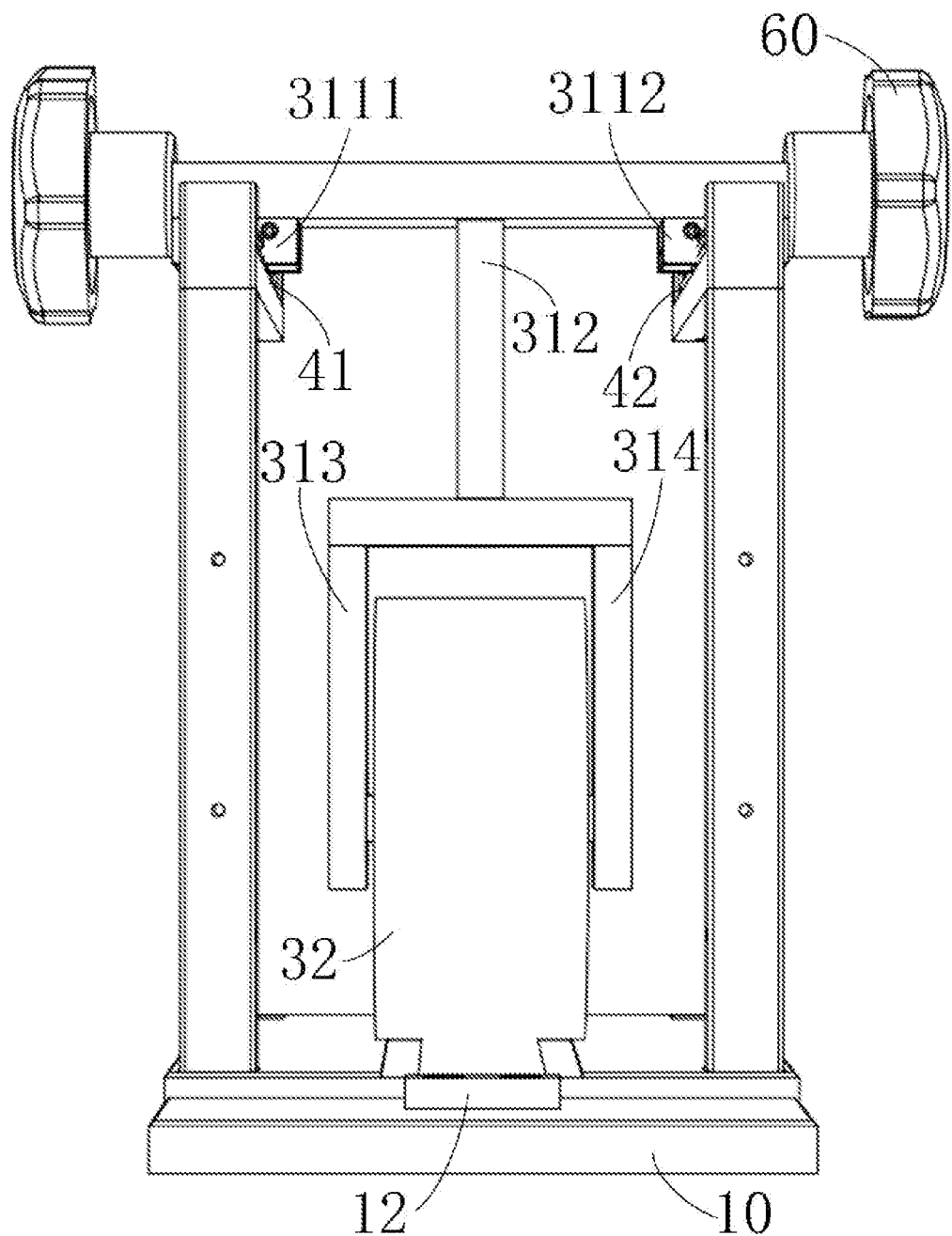
FIG. 2 is a schematic three-dimensional structural diagram of a rolling device according to one or a plurality of embodiments.
Figure 3:
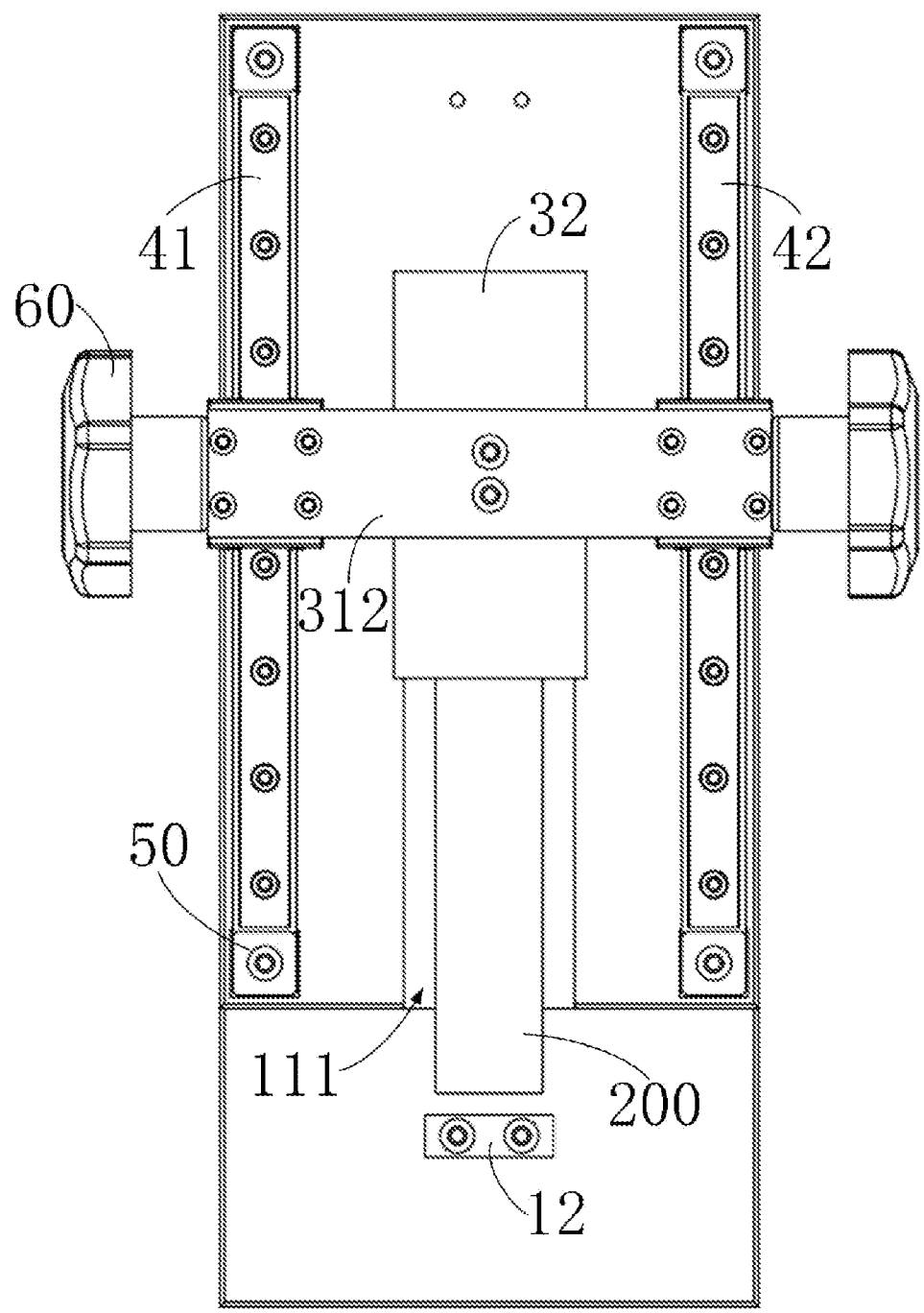
FIG. 3 is a top view of a rolling device according to one or a plurality of embodiments.

Referring to FIG. 1, FIG. 2, and FIG. 3 together, in some embodiments, the guide rail includes a first sub-guide rail 41 and a second sub-guide rail 42 arranged at an interval in a second direction b, and the slider includes a first sub-slider 3111 and a second sub-slider 3112 corresponding to the first sub-guide rail 41 and the second sub-guide rail 42, respectively. The connecting element 31 is connected between the first sub-slider 3111 and the second sub-slider 3112. The second direction b intersects the first direction a, and the second direction b is parallel to the working surface 11.

It should be noted that when the guide rail includes the first sub-guide rail 41 and the second sub-guide rail 42 arranged at an interval in the second direction b, the bracket 20 may be arranged as a first sub-bracket and a second sub-bracket arranged at an interval in the second direction b. The first sub-bracket and the second sub-bracket are each composed of two carlings perpendicular to the working surface 11 and a beam parallel to the working surface 11. In addition, each beam is configured to extend in the first direction a and is connected between two corresponding carlings.

Therefore, the first sub-guide rail 41 is capable of being mounted on one of the beams in the first direction a, and the second sub-guide rail 42 is capable of being mounted on the other beam in the first direction a. The first sub-slider 3111 and the second sub-slider 3112 are respectively connected to two opposite ends of the connecting element 31, the first sub-slider 3111 is in matching connection with the first sub-guide rail 41, and the second sub-slider 3112 is in matching connection with the second sub-guide rail 42, that is, the connecting element 31 is erected between the first sub-guide rail 41 and the second sub-guide rail 42. Therefore, the arrangement of the connecting element 31 on the bracket 20 is more stable.

Furthermore, both the first direction a and the second direction b are parallel to the working surface 11, and the first direction a and the second direction b are perpendicular to each other, that is, the first direction a and the second direction b are two mutually perpendicular directions in the horizontal plane.

Specifically, the first sub-bracket and the second sub-bracket are arranged on the base 10 at an interval in the second direction b. The connecting element 31 straddles the first sub-bracket and the second sub-bracket through the first sub-slider 3111 and the second sub-slider 3112, and the connecting element 31 is arranged perpendicular to the first sub-guide rail 41 and the second sub-guide rail 42.

Through the above structure, the connecting element 31 is capable of being more stably arranged on the guide rail and moving stably in the first direction a. In this process, the connecting element 31 drives the rolling member 32 to move synchronously, so that the rolling member 32 is capable of applying a stable rolling force to the member to be rolled 200 placed on the working surface 11, thereby improving the rolling precision.

Figure 4:
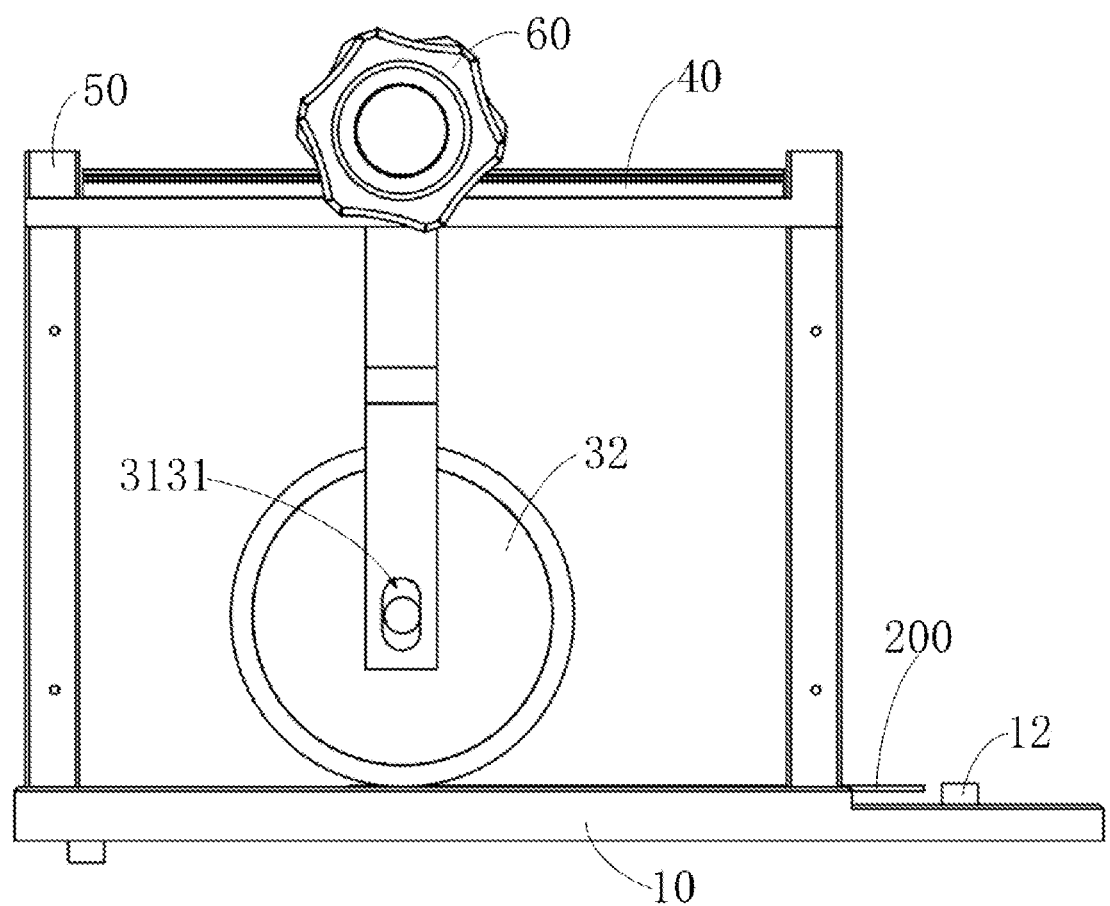
FIG. 4 is a side view of a rolling device according to one or a plurality of embodiments.

Referring to FIG. 2 and FIG. 4 together, in some embodiments, the connecting element 31 includes a connecting main body 312 and a first connecting beam 313 and a second connecting beam 314 respectively arranged on the connecting main body 312. The first connecting beam 313 and the second connecting beam 314 are respectively located on two opposite sides of the rolling member 32 in the axial direction of the rotating shaft, and the first connecting beam 313 and the second connecting beam 314 are each provided with a through hole 3131 for accommodating the rotating shaft.

The connecting main body 312 can realize the connection with the bracket 20. Specifically, one end of the connecting main body 312 is connected to the first connecting beam 313 and the second connecting beam 314, and the other end is connected to the first sub-slider 3111 and the second sub-slider 3112 and arranged between the first sub-guide rail 41 and the second sub-guide rail 42 of the bracket 20 through the first sub-slider 3111 and the second sub-slider 3112.

Further, in order that the rolling member 32 driven by the connecting element 31 is capable of better rotating around the rotating shaft, the axial direction of the rotating shaft is arranged parallel to the second direction b, that is, the first connecting beam 313 and the second connecting beam 314 are arranged in the second direction b at an interval, and the rolling member 32 is arranged between the first connecting beam 313 and the second connecting beam 314.

Specifically, the rolling member 32 may be arranged as a pressing wheel, and a rotating shaft on the pressing wheel passes through the through holes 3131 on the first connecting beam 313 and the second connecting beam 314, so that the pressing wheel is capable of rotating around the rotating shaft in a process of moving synchronously in the first direction a along with the connecting element 31, so as to better roll the member to be rolled 200.

Through the above structure, the rolling member 32 smoothly rotating around the rotating shaft while moving in the first direction a along with the connecting element 31 is capable of being achieved. Therefore, in the rolling process, the rolling member 32 is capable of rolling the member to be rolled 200 in the first direction a, so that the force on the member to be rolled 200 is uniform, and the rolling precision is improved.

Referring to FIG. 1 and FIG. 4, in some embodiments, the through hole 3131 is configured as a kidney-shaped hole extending in a third direction c, and the third direction c is arranged to intersect the working surface 11.

Specifically, the third direction c is perpendicular to the working surface 11, that is, the third direction c is a vertical direction. When the rolling member 32 is mounted between the first connecting beam 313 and the second connecting beam 314 through the rotating shaft, the rolling member 32 is capable of moving up and down in the through hole 3131 in the vertical direction.

Thus, when the member to be rolled 200 is not placed on the working surface 11, the rolling member 32 is supported on the working surface 11 under the action of its own gravity. When the member to be rolled 200 needs to be rolled, the rolling member 32 is lifted up to move upward in the through hole 3131. The member to be rolled 200 is placed on the working surface 11 from a gap between the rolling member 32 and the working surface 11, and at this time, the rolling member 32 is released, so that the rolling member 32 can press, under the action of its own gravity, against the member to be rolled 200. At this time, a rolling pressure applied by the rolling member 32 to the member to be rolled 200 is only the own gravity of the rolling member 32, and the own gravity of the rolling member 32 is a fixed value. Therefore, it can be ensured that the rolling pressure applied to the member to be rolled 200 is kept constant.

It should be noted that of members to be rolled 200 in different sizes may require to be applied with rolling pressures having different magnitudes. In view of this situation, different rolling pressures may be applied to different members to be rolled 200 by replacing the rolling members 32 with different gravity.

In addition, the third direction c may also be set as a direction that intersects but and is not perpendicular to the working surface 11. That is, the third direction c may be set as any direction between the vertical direction and the working surface 11. At this time, when the rolling member 32 is arranged between the first connecting beam 313 and the second connecting beam 314 through the rotation of the rotating shaft, the rolling member 32 is still capable of generating an upward or downward displacement in the through hole 3131 to apply the own gravity of the rolling member 32 to the member to be rolled 200.

Through the above structure, it can be ensured that the rolling pressure applied to the member to be rolled 200 in the rolling process is always kept constant, thereby ensuring the accuracy of the rolling process and improving the accuracy of the subsequent shear force and bonding force measurement.

In some embodiments, the rolling device 100 further includes first position limiting members 50 arranged at opposite ends of the bracket 20 in the first direction a, and the first position limiting members 50 are used for limiting the rolling assembly 30 on the bracket 20 in the first direction a.

Specifically, when the connecting element 31 drives the rolling member 32 to move in the first direction a on the guide rail, in order to prevent the connecting element 31 from being separated from the guide rail in the moving process, first position limiting members 50 are arranged on the bracket 20. Every two first position limiting members 50 form a group and are arranged correspondingly to one guide rail. That is, the two first position limiting members 50 in each group are respectively arranged at opposite ends of the corresponding guide rail in the first direction a. When the connecting element 31 moves in the first direction a on the guide rail, the two first position limiting members 50 are capable of limiting the position of the connecting element 31 to prevent the connecting element 31 from detaching from the guide rail, thereby improving the stability of the connecting element 31 on the guide rail.

By arranging the first position limiting members 50, the rolling assembly 30 is capable of being arranged on the bracket 20 more stably, thereby ensuring the smooth progress of the rolling process.

In some embodiments, an accommodating groove 111 for placing at least a part of the member to be rolled 200 is arranged on the working surface 11, and the depth of the accommodating groove 111 is smaller than the thickness of the member to be rolled 200.

The accommodating groove can limit a position of the member to be rolled 200 placed on the working surface 11. When the member to be rolled 200 is rolled by the rolling member 32, the accommodating groove can prevent the member to be rolled 200 from moving, thereby ensuring the smooth progress of the rolling process.

Specifically, when the member to be rolled 200 is a rolled steel plate and an electrode sheet fixed on the rolled steel plate, the depth of the accommodating groove should be less than a sum of the thicknesses of the rolled steel plate and the electrode sheet. Therefore, when the rolled steel plate and the electrode sheet are placed in the accommodating groove, the electrode sheet may protrude from an edge of the accommodating groove, and at this time, a constant rolling pressure is capable of being applied to the electrode sheet through the rolling member 32.

Therefore, the accommodating groove 111 can limit the position of the member to be rolled 200 to ensure that the position of the member to be rolled 200 remains stable in the rolling process, so that the rolling process is smoother.

Figure 5:
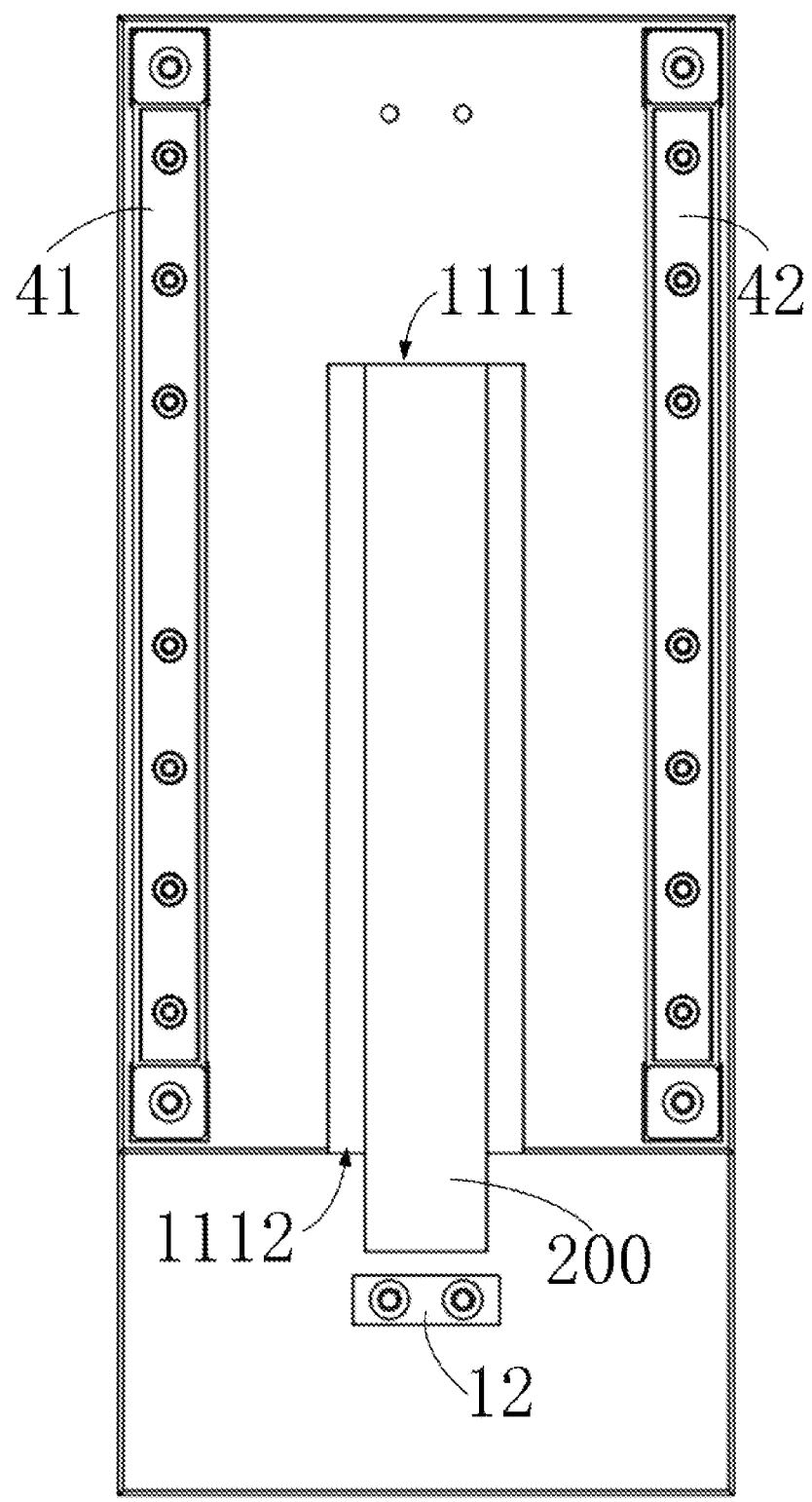
FIG. 5 is a top view of a working surface according to one or a plurality of embodiments.

Referring to FIG. 1 and FIG. 5 together, in some embodiments, the accommodating groove 111 has a closed end 1111 and an open end 1112 oppositely disposed in the first direction a. In a direction from the open end 1112 to the closed end 1111, the closed end 1111 is capable of limiting the position of the member to be rolled 200 in the accommodating groove 111.

Different members to be rolled 200 have different lengths, and therefore, in order that the accommodating groove is capable of adapting to members to be rolled 200 in various specifications, the accommodating groove is provided with the closed end 1111 and the open end 1112 arranged oppositely. When the member to be rolled 200 is placed in the accommodating groove, if the length of the member to be rolled 200 is greater than the length of the accommodating groove, the member to be rolled 200 can stretch out from the open end 1112 of the accommodating groove, which is also capable of achieving position limiting of the member to be rolled 200 through the accommodating groove.

Through the above structure, the accommodating groove is capable of adapting to members to be rolled 200 in different sizes, so that the application range of the rolling device 100 is wider.

In some embodiments, the base 10 is provided with a second position limiting member 12, and the second position limiting member 12 is arranged corresponding to the open end 1112 at an interval. In a direction from the closed end 1111 to the open end 1112, the second position limiting member 12 is capable of limiting the position of the member to be rolled 200 in the accommodating groove 111.

Specifically, the second position limiting member 12 is a bump corresponding to the open end 1112 and arranged on the base 10 at an interval. When the member to be rolled 200 is placed in the accommodating groove, and the member to be rolled 200 is rolled by the rolling member 32, the closed end 1111 of the accommodating groove can cooperate with the second position limiting member 12 to realize the position limiting of the member to be rolled 200 in the first direction a, thereby ensuring the smooth progress of the rolling process.

In some embodiments, the rolling device 100 further includes an operating member 60 arranged on the rolling assembly 30, and the operating member 60 is used for providing a force application position on the rolling assembly 30.

When rolling is required, a certain external force may be applied to the rolling assembly 30 through the operating member 60, so that it moves in the first direction a on the guide rail, thereby realizing the rolling for the member to be rolled 200.

Specifically, the operating member 60 may be configured as a hand wheel, and includes two hand wheels respectively arranged at two opposite ends of the connecting element 31 in an extending direction of the connecting element 31. Therefore, it is convenient to apply an external force to the connecting element 31, so that the connecting element 31 drives the rolling member 32 to move in the first direction a, thereby improving the operability.

Based on the same concept as the above rolling device 100, the present application provides a measuring device, including the above rolling device 100.

When the present application is specifically used, firstly, the rolling member 32 is lifted up, so that a certain gap is generated between the rolling member 32 and the working surface 11, and the member to be rolled 200 is placed in the accommodating groove on the working surface 11 from the gap. After the placement is completed, the rolling member 32 is released, and the rolling member 32 presses, under the action of its own gravity, against the member to be rolled 200. An external force is applied at the position of the operating member 60, so that the connecting element 31 moves in the first direction a on the guide rail, and drives the rolling member 32 to move synchronously.

In the moving process, the rolling member 32 rolls against the member to be rolled 200, and the rolling pressure applied to the member to be rolled 200 is the gravity of the rolling member 32. Therefore, the rolling pressure is always kept constant, and the precision of rolling is improved, thereby improving the accuracy of the subsequent shear force and bonding force measurement.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

The invention claimed is:

1. A rolling device, comprising:
  a base having a working surface for placing a member to be rolled;
  a bracket arranged on the base; and
  a rolling assembly movably mounted on the bracket in a first direction, the rolling assembly being used for providing a pressure to the member to be rolled on the working surface; wherein the first direction is parallel to the working surface; herein the rolling assembly comprises a connecting element and a rolling member, the connecting element is movably mounted on the bracket in the first direction, the rolling member is rotatably arranged on the connecting element around a rotating shaft, and an axial direction of the rotating shaft is parallel to the working surface; wherein the connecting element comprises a connecting main body as well as a first connecting beam and a second connecting beam respectively arranged on the connecting main body, the first connecting beam and the second connecting beam are respectively located on two opposite sides of the rolling member in the axial direction of the rotating shaft, and the first connecting beam and the second connecting beam are each provided with a through hole for accommodating the rotating shaft;
  characterized in that the through hole is configured as a kidney-shaped hole extending in a third direction and the third direction is arranged to intersect the working surface.

2. The rolling device according to claim 1, wherein the rolling device comprises a guiding member arranged on the bracket, and a matching portion that matches the guiding member is arranged on the connecting element, so that the connecting element is capable of moving in the first direction.

3. The rolling device according to claim 2, wherein the guiding member is configured as a guide rail extending in the first direction, and the matching portion is configured as a slider that fits the guide rail.

4. The rolling device according to claim 3, wherein the guide rail comprises a first sub-guide rail and a second sub-guide rail arranged at an interval in a second direction, the slider comprises a first sub-slider and a second sub-slider corresponding to the first sub-guide rail and the second sub-guide rail, respectively, and the connecting element is connected between the first sub-slider and the second sub-slider;
  wherein the second direction intersects the first direction, and the second direction is parallel to the working surface.

5. The rolling device according to claim 1, wherein the rolling device further comprises first position limiting members arranged at opposite ends of the bracket in the first direction, and the first position limiting members are used for limiting the rolling assembly on the bracket in the first direction.

6. The rolling device according to claim 1, wherein an accommodating groove for placing at least a part of the member to be rolled is arranged on the working surface, and the depth of the accommodating groove is smaller than the thickness of the member to be rolled.

7. The rolling device according to claim 6, wherein the accommodating groove has a closed end and an open end oppositely arranged in the first direction, and in a direction from the open end to the closed end, the closed end is capable of limiting the position of the member to be rolled in the accommodating groove.

8. The rolling device according to claim 7, wherein a second position limiting member is arranged on the base, the second position limiting member is arranged corresponding to the open end at an interval, and in a direction from the closed end to the open end, the second position limiting member is capable of limiting the position of the member to be rolled placed in the accommodating groove.

9. The rolling device according to claim 1, wherein the rolling device further comprises an operating member arranged on the rolling assembly, and the operating member is used for providing a force application position on the rolling assembly.

10. A measuring device, comprising the rolling device according to claim 1.

* * * * *